US005819195A

United States Patent [19]

Iwata

[11] Patent Number: 5,819,195

[45] Date of Patent: Oct. 6, 1998

[54] DEVICE FOR DETECTING A MALFUNCTION OF AIR FUEL RATIO SENSOR

[75] Inventor: Yoichi Iwata, Yokohama, Japan

[73] Assignee: Toyota Jidosha Kabushiki Kaisha, Toyota, Japan

[21] Appl. No.: 659,348

[22] Filed: Jun. 6, 1996

[30] Foreign Application Priority Data

Jun. 19, 1995 [JP] Japan .................................... 7-151722

[51] Int. Cl.[6] ........................... F02D 41/34; G01M 15/00

[52] U.S. Cl. .......................... 701/103; 701/107; 123/672; 123/688

[58] Field of Search .................................... 701/102, 103, 701/107, 108, 109; 60/276, 277, 285; 123/672, 679, 690, 688, 571, 703

[56] References Cited

U.S. PATENT DOCUMENTS

| | | | |
|---|---|---|---|
| 5,216,882 | 6/1993 | Kuroda et al. | 73/118.1 |
| 5,247,793 | 9/1993 | Yamada et al. | 60/276 |
| 5,259,189 | 11/1993 | Baier et al. | 123/691 |
| 5,311,737 | 5/1994 | Komatsu et al. | 60/276 |
| 5,341,642 | 8/1994 | Kurihara et al. | 60/276 |
| 5,400,592 | 3/1995 | Mukaihira et al. | 123/674 |
| 5,444,977 | 8/1995 | Kawabata | 60/276 |
| 5,579,637 | 12/1996 | Yamashita et al. | 60/276 |
| 5,610,321 | 3/1997 | Shinmoto | 73/117.3 |

FOREIGN PATENT DOCUMENTS

| | | |
|---|---|---|
| A-61-31640 | 2/1986 | Japan . |
| A-5-26074 | 2/1993 | Japan . |
| A-5-26075 | 2/1993 | Japan . |

*Primary Examiner*—Tan Q. Nguyen
*Attorney, Agent, or Firm*—Oliff & Berridge, PLC

[57] ABSTRACT

A device is provided for detecting a malfunction of an air fuel ratio sensor disposed downstream of a catalytic converter in an exhaust passage of an engine. The device calculates a differential value of a sensor output with respect to time. Then the device compare the differential value of said sensor output with a predetermined value and calculate a frequency of the differential value of the sensor output which exceeds the predetermined value. Then the device compares the frequency with a predetermined value and determine that the sensor is malfunctioning if the frequency does not exceed the predetermined value.

5 Claims, 6 Drawing Sheets

DEVICE FOR DETECTING A MALFUNCTION OF AIR FUEL RATIO SENSOR

BACKGROUND OF THE INVENTION

1. Field of the Invention

The present invention relates to a device for detecting a malfunction of air fuel ratio sensor disposed in an exhaust passage, especially a sensor located downstream of a catalytic converter.

2. Description of the Related Art

A sensor element of the air fuel ratio sensor disposed in an exhaust passage is usually covered by a punched cover and detects an air fuel ratio of the exhaust gas which flows inside the cover through the holes in the punched cover. Therefore, the sensitivity of the air fuel ratio sensor deteriorates if the holes are clogged after long use. If an emission control of the engine is performed based upon such a malfunctioning air fuel ratio sensor, the exhaust gas emissions will worsen because of incorrect control based upon output of such malfunctioning sensor. Therefore, many kinds of apparatus have been developed for detecting a malfunction of the air fuel ratio sensor. For example, Japanese Unexamined Patent Publication No. 61-31640 discloses an apparatus which detects a malfunction of air fuel ratio sensor based upon a calculation of a time differential of a sensor output and, more concretely, by comparing mean values of the time differential value of a sensor output, or deviations of the time differential value of a sensor output, or the maximum values of the time differential value of a sensor output corresponding to conditions when the sensor is normally functioning and when the sensor is malfunctioning, respectively with each other.

The above apparatus was developed for detecting a malfunction of air fuel ratio sensor disposed upstream of the catalytic converter which outputs a relatively large fluctuating value in a normally functioning condition and outputs a relatively small fluctuating value in a malfunctioning condition.

However, in a recent very accurate A/F control system, an air fuel ratio sensor disposed downstream of the catalytic converter outputs small fluctuating value near the stoichiometric level even in a normal functioning condition.

Therefore, the output difference between normal functioning condition and malfunctioning condition is small and correct detection of the malfunction cannot be obtained by the above described prior art.

SUMMARY OF THE INVENTION

Therefore, an object of the present invention is to provide a device for correct detection of a malfunction of an air fuel ratio sensor disposed downstream of a catalytic converter in an exhaust passage.

According to the present invention there is provided a device for detecting a malfunctioning of an air fuel ratio sensor disposed in an exhaust passage, having a catalytic converter therein, of an engine. The device comprises, a means for calculating a differential value of a sensor output with respect to time, a means for comparing the differential value of said sensor output with a predetermined value, a means for calculating the frequency of the differential value of the sensor output exceeding the predetermined value, a means for comparing the frequency with a predetermined value and a means for determining a malfunctioning of an air fuel ratio sensor if the frequency does not exceed a predetermined value.

The present invention will be more fully understood from the description of preferred embodiments of the invention set forth below, together with the accompanying drawings.

DESCRIPTION OF THE PREFERRED EMBODIMENTS

Figure 1:
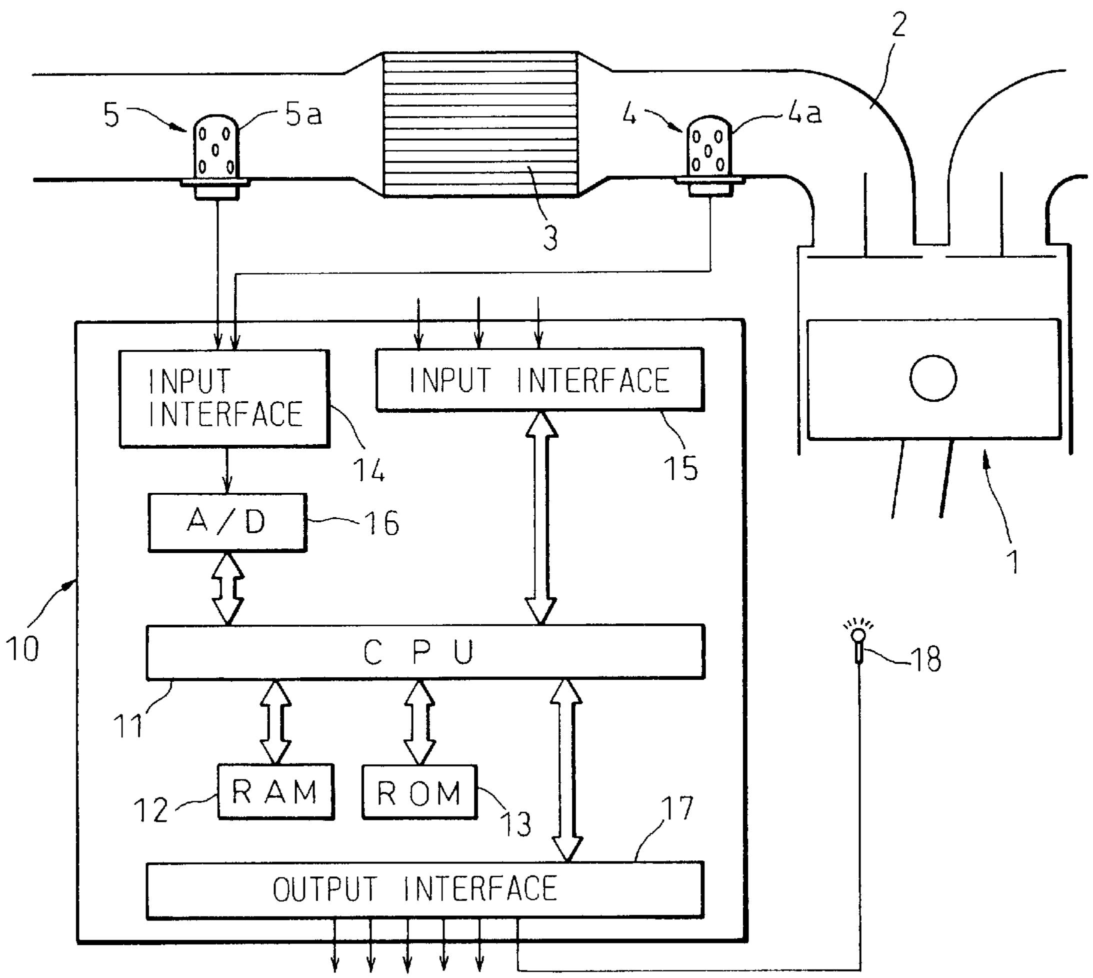
FIG. 1 is a schematic view of a structure of embodiment of the present invention.

FIG. 1 schematically shows a structure of an embodiment of the present invention. In FIG. 1, a catalytic converter 3 is disposed in an exhaust passage 2 which is extending from an internal combustion engine 1. A front $O_2$ sensor 4 and a rear $O_2$ sensor 5 are attached to the exhaust gas passage 2 respectively upstream and downstream of the catalytic converter 3. The front $O_2$ sensor 4 and the rear $O_2$ sensor 5 both have punched covers **4*a* and 5*a*** which respectively covers sensor element (not shown) located therein.

An engine control computer (ECU) 10 is constructed as a digital computer comprising CPU (microprocessor) 11, RAM (random access memory) 12, ROM (read only memory) 13, input interfaces 14 and 15, ADC (analog-digital converter) 16 and output interface 17 which are interconnected to each other. The ECU further comprises counter and timer both of which are not shown in FIG. 1.

In this embodiment the ECU 10 works as the means for calculating a differential value of a sensor output with respect to time, the means for comparing the time differential value with a predetermined value, the means for calculating the frequency of the differential value of the sensor output, a means for comparing the frequency with a predetermined value and a means for determining the malfunctioning of the air fuel ratio sensor if said frequency does not exceed a predetermined value, in addition to controlling fuel injection, ignition and other functions.

A signal output from the sensor element of the rear $O_2$ sensor 5 is input to the CPU 11 through the input interface 14 and the ADC 16. The CPU 11 calculates for detecting a malfunction of the rear $O_2$ sensor 5. If a malfunction of the rear $O_2$ sensor 5 is detected the CPU outputs a signal to light the malfunction warning lamp 18 to inform the driver of the malfunction.

A controlling principle of the embodiment which is constructed as described above will be explained with reference to FIGS. 2 to 5.

Figure 2:
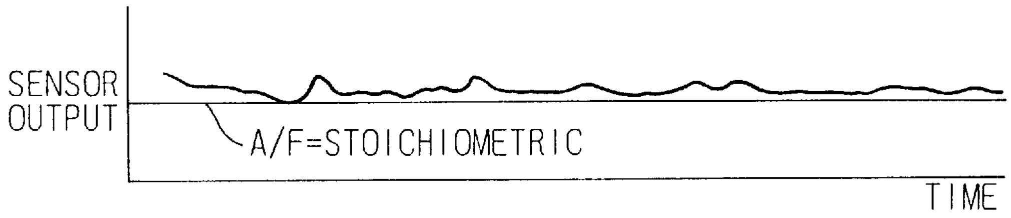
FIG. 2 shows a sensor output when the rear $O_2$ sensor is normally functioning.

FIG. 2 shows an output signal of the rear $O_2$ sensor 5 when it is functioning normally. As shown in FIG. 2, it fluctuates in relation to the change in the concentration of oxygen contained in the exhaust gas while keeping the peak small near the stoichiometric level.

Figure 3:
FIG. 3 shows a sensor output when the rear $O_2$ sensor is malfunctioning.

FIG. 3 shows an output signal of the rear $O_2$ sensor 5 when it is malfunctioning. As shown in FIG. 3, it fluctuates gradually keeping the peak small near the stoichiometric level.

Figure 4:
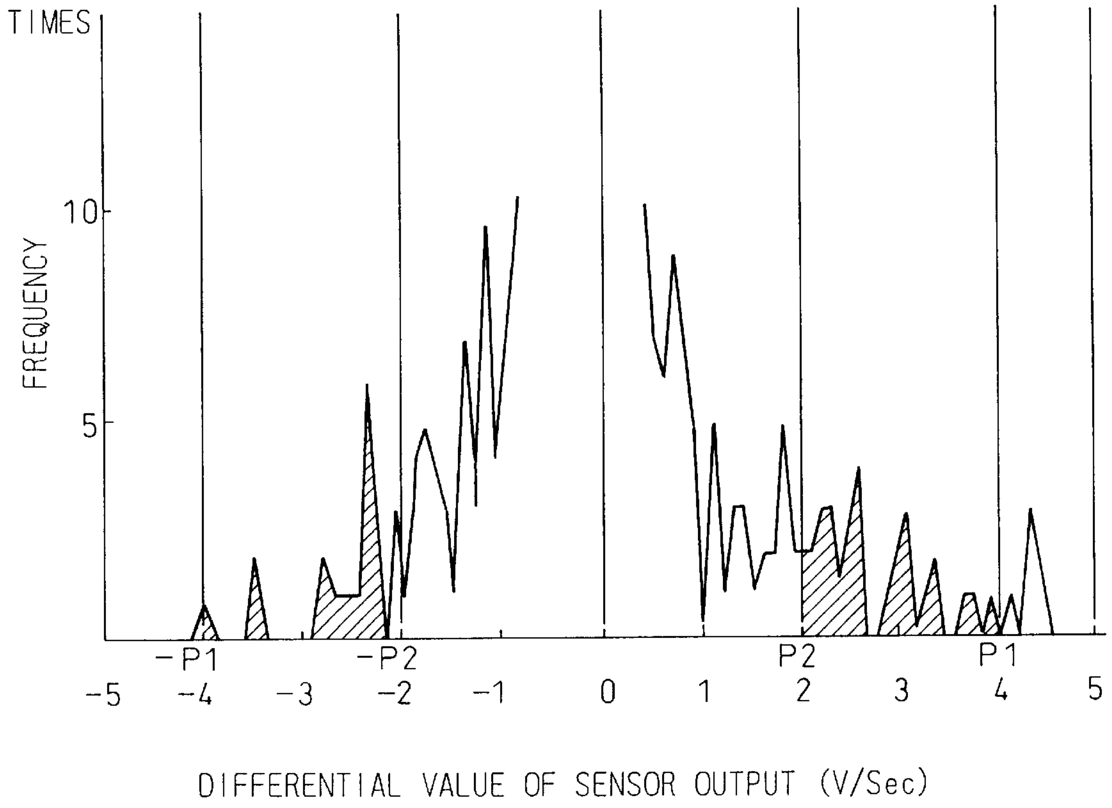
FIG. 4 is a histogram showing distribution of the differential values of the output of the rear $O_2$ sensor which fluctuates as shown in FIG. 2.
Figure 5:
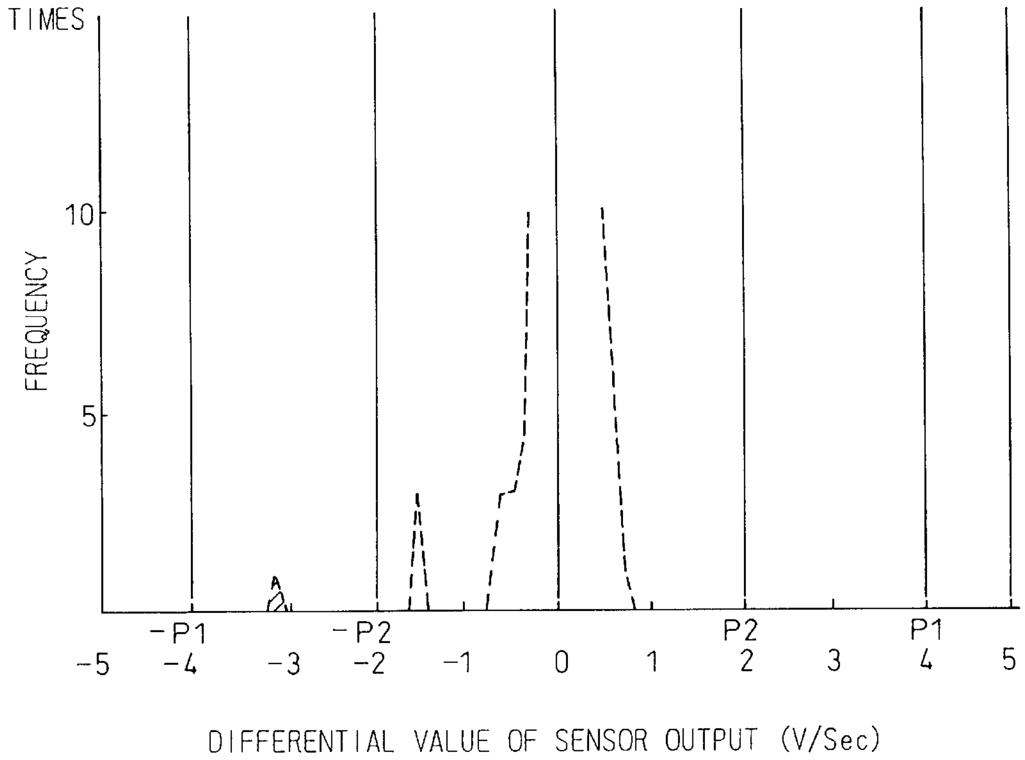
FIG. 5 is a histogram showing distribution of the differential values of the output of the rear $O_2$ sensor which fluctuates as shown in FIG. 3.

FIGS. 4 and 5 are histograms showing distribution of differential values with respect to time of the output of the rear $O_2$ sensor 5 which respectively fluctuates as shown in FIGS. 2 and 3.

In FIG. 4, i.e. when the rear $O_2$ sensor 5 is normally functioning, most of the differential of the output of the rear $O_2$ sensor 5 have values near zero and the number decreases relative to the increase of the absolute value of the differential value of the output of the rear $O_2$ sensor. It means some of the values are also distributed away from zero.

However, in FIG. 5, i.e. when the rear $O_2$ sensor 5 is malfunctioning, almost all of the differential values of the output of the rear $O_2$ sensor have values near zero, and only few of them have values away from zero.

For example, in FIG. 4, the absolute values of the output of the rear $O_2$ sensor 5 exceed 2.0 V/sec fifty-five (55) times because they become more than +2.0 V/sec thirty-five (35) times and they become less than −2.0 V/sec twenty (20) times. On the other hand, in FIG. 5 only one absolute value of differential values of the output of the rear $O_2$ sensor exceeds 2.0 V/sec.

The present invention detects the malfunctioning of the air fuel ratio sensor using the above described difference.

If the absolute values of the differential of the sensor output exceed predetermined threshold more than the predetermined times within a predetermined period, the sensor is determined to be normally functioning. On the other hand, if the absolute values of the differential of the sensor output exceed the predetermined threshold less than predetermined times within the predetermined period, the sensor is determined to be malfunctioning.

In practice, to avoid counting electrical noise the absolute value of the differential which exceeds predetermined upper limit is eliminated from the count, accordingly only an absolute value of the differential within some band is only counted.

Figure 6:
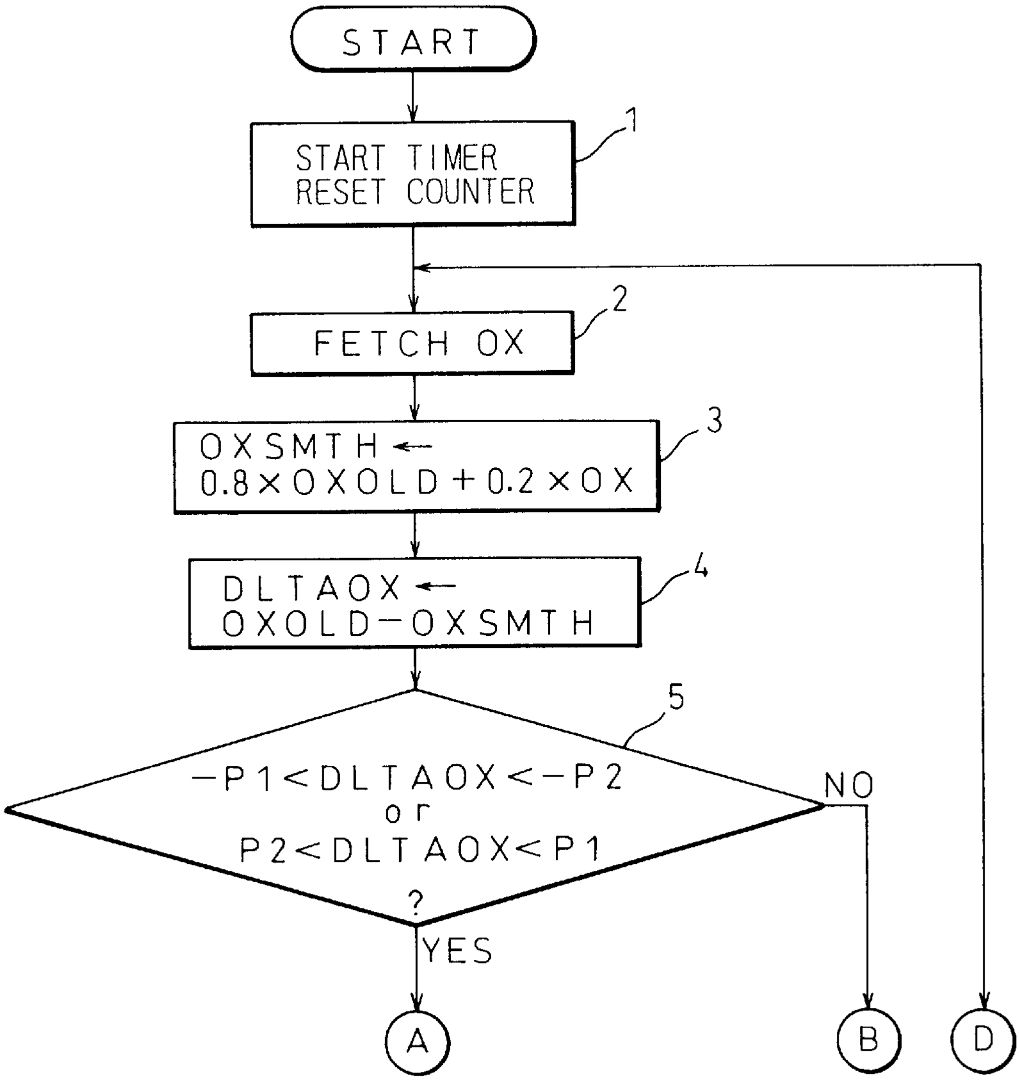
FIGS. 6 and 7 are flow charts of a routine for detecting the malfunction of the sensor.
Figure 7:
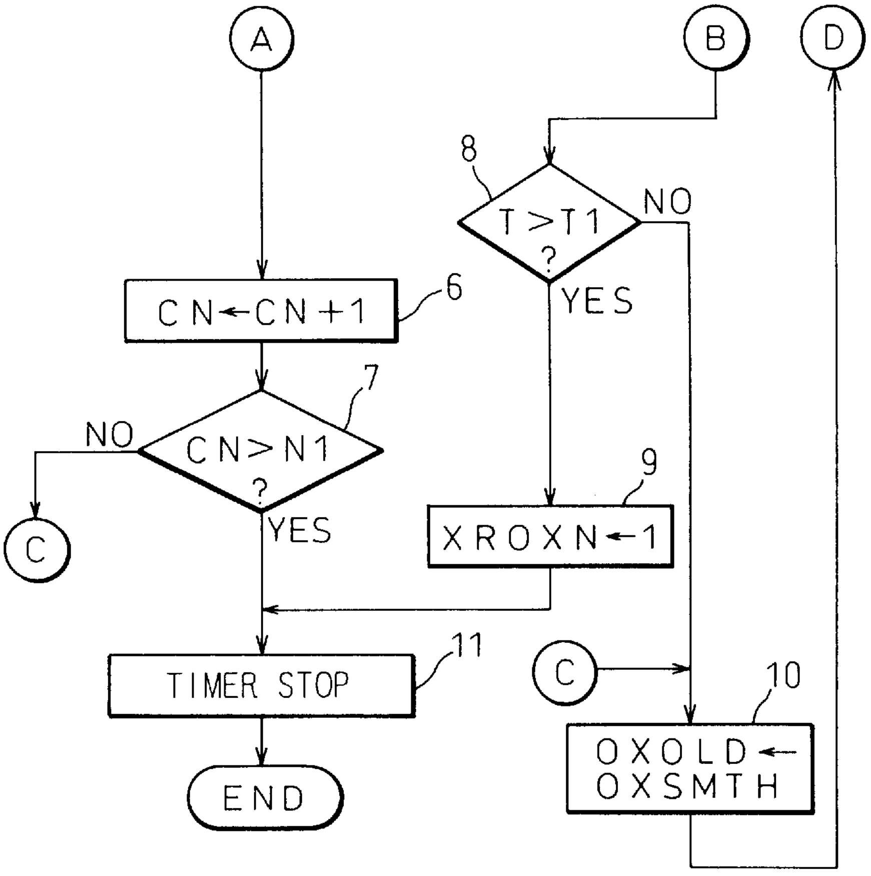

FIGS. 6 and 7 show a flow chart for executing the routine of the detecting malfunction of the rear $O_2$ sensor according to the above described principle.

At step 1, a timer to set counting period and a counter to count absolute value of the differential of the sensor output within predetermined band are started.

At step 2, sensor output value OX is fetched.

At step 3, gradated sensor output value OXSMTH is calculated, by adding 20% of the new sensor output value to 80% of the old gradated value OXOLD. However, another appropriate gradating method also can be applied.

At step 4, a differential value DLTAOX is calculated by substructing new gradated value OXSMTH from the old gradated value OXOLD.

At step 5, it is determined whether or not the DLTAOX calculated at step 4 is within a predetermined band between P1 and P2 or between −P1 and −P2, i.e. whether or not the absolute value of DLTAOX is within a predetermined band between P1 and P2. The P1 is, as previously noted, a threshold for eliminating noise.

If it is determined that DLTAOX is within a predetermined band between P1 and P2 or between −P1, and −P2, the routine proceeds to step 6.

At step 6, the count number CN of a counter in the ECU 10 is incremented.

At step 7, it is determined whether or not the new count number CN exceeds N1, where N1 is a predetermined threshold. If it is determined that the new count number CN exceeds N1, the routine is ended after stopping the timer at step 11, since the result that new count number CN exceeds N1 means that the rear $O_2$ sensor 5 is functioning normally.

If it is determined NO at step 5, i.e. if the DLTAOX is not within a predetermined band between P1 and P2 or between −P1, and −P2, the routine proceeds to step 8.

At step 8, it is determined whether or not the elapsed time T after starting of the timer exceeds a predetermined period T1. If it is that the elapsed time T after starting of the timer exceeds a predetermined period T1, the routine proceeds to step 9 and the flag XROXN is set ("1"), since the result that the elapsed time T after starting of the timer exceeds a predetermined period T1 means that output of the rear $O_2$ sensor 5 did not show enough fluctuations to determine that the rear $O_2$ sensor 5 is normally functioning.

After setting flag XROXN at step 9, the routine is ended after stopping the timer at step 11.

The value of the flag XROXN is sent to the output interface circuit 17 of the ECU 10 and a switch (not shown) for lighting the sensor malfunction warning lamp 18 is operated. Thus, the malfunction of the rear $O_2$ sensor is informed to the driver by lighting the sensor malfunction warning lump 18.

If the results at step 7 and 8 are negative the routine returns to step 2 to fetch the next value of sensor output after inputting OXSMTH to OXOLD at step 10.

In the embodiment described above, the differential value of the sensor output is calculated, it is determined that the rear $O_2$ sensor is malfunctioning if the differential values of the sensor output are concentrated near zero, and it is determined that the rear $O_2$ sensor is normally functioning if the differential values of the sensor output are also distributed away from zero.

According to the present invention a malfunction of the air fuel ratio sensor can be accurately detected even if the sensor output is small in an advanced air fuel ratio control system, since the present invention depends upon a definite principle that if the air fuel ratio sensor is malfunctioning the differential values of the sensor output are concentrated near zero and if the air fuel ratio sensor is normally functioning the differential values of the sensor output are also distributed away from zero.

I claim:

1. A device for detecting a malfunction of an air fuel ratio sensor disposed downstream of a catalytic converter in an exhaust passage of an engine, comprising:

means for calculating a differential value of a sensor output with respect to time;

means for comparing said differential value of said sensor output with a predetermined differential value;

means for calculating a frequency of said differential value of said sensor output exceeding said predetermined differential value;

means for comparing said frequency with a predetermined frequency value; and means for determining a malfunctioning of an air fuel ratio sensor if said frequency does not exceed the predetermined frequency value.

2. A device according to claim 1, wherein said device further comprises a warning device for informing a malfunction of said sensor to a driver.

3. A device according to claim 1, wherein the differential value is gradated for comparing with the predetermined differential value.

4. A method for detecting a malfunction of an air fuel ratio sensor disposed downstream of a catalytic converter in an exhaust passage of an engine comprising:

calculating a differential value of a sensor output with respect to time;

comparing the differential value of the sensor output with a predetermined differential value;

calculating a frequency with which the differential value of said sensor output exceeds said predetermined differential value;

comparing said frequency with a predetermined frequency value; and determining a malfunction of the air fuel ratio sensor if the frequency does not exceed the predetermined frequency value.

5. The method according to claim 4, further comprising the step of:

warning a driver if a malfunction of the air fuel ratio sensor is determined.

* * * * *